United States Patent [19]

Cassidy et al.

[11] Patent Number: 5,166,992
[45] Date of Patent: Nov. 24, 1992

[54] WAVELENGTH SELECTIVE OPTICAL WAVEGUIDE COUPLER

[75] Inventors: Stephen A. Cassidy; Peter Yennadhiou, both of Ipswich, England

[73] Assignee: British Telecommunications public limited company, London, England

[21] Appl. No.: 602,251
[22] PCT Filed: Jun. 7, 1989
[86] PCT No.: PCT/GB89/00616
§ 371 Date: Nov. 6, 1990
§ 102(e) Date: Nov. 6, 1990
[87] PCT Pub. No.: WO89/12242
PCT Pub. Date: Dec. 14, 1989

[30] Foreign Application Priority Data
Jun. 9, 1988 [GB] United Kingdom ............... 8813667

[51] Int. Cl.$^5$ .............................................. G02B 6/28
[52] U.S. Cl. ........................................ 385/24; 385/25
[58] Field of Search ................. 350/96.15, 96.16; 385/24, 25, 30

[56] References Cited

U.S. PATENT DOCUMENTS

| | | | |
|---|---|---|---|
| 4,479,701 | 10/1984 | Newton et al. | 385/24 |
| 4,586,783 | 5/1986 | Campbell et al. | 385/32 |
| 4,589,725 | 5/1986 | Dyott | 350/96.33 |
| 4,669,816 | 6/1987 | Thompson | 350/96.15 |
| 4,673,270 | 6/1987 | Gordon | 350/96.15 |
| 4,749,249 | 6/1988 | Hockaday et al. | 350/96.20 |
| 4,832,437 | 5/1989 | Kim et al. | 350/96.15 |
| 4,869,570 | 9/1989 | Yokohama et al. | 350/96.15 |
| 4,883,335 | 11/1989 | Alferness et al. | 350/96.15 |

FOREIGN PATENT DOCUMENTS

| | | |
|---|---|---|
| 82/01533 | 5/1982 | European Pat. Off. . |
| 82/04328 | 12/1982 | European Pat. Off. . |
| 0149891 | 7/1985 | European Pat. Off. . |
| 193966 | 10/1986 | European Pat. Off. . |
| 0236712 | 1/1987 | European Pat. Off. . |
| 0230269 | 7/1987 | European Pat. Off. . |
| 0290253 | 9/1988 | European Pat. Off. . |
| 2506954 | 12/1982 | France .............. 350/96.15 |
| 2577590 | 8/1986 | France . |
| 1574044 | 9/1980 | United Kingdom . |
| 2046466 | 11/1980 | United Kingdom . |
| 2186994 | 8/1987 | United Kingdom . |

OTHER PUBLICATIONS

Patent Abstracts of Japan, No. 58-95701, (Jun. 7, 1983) vol. 7, No. 196, Aug. 26, 1983, (P-219) (1341), "Optical Switch".

*Primary Examiner*—Frank Gonzalez
*Attorney, Agent, or Firm*—Nixon & Vanderhye

[57] ABSTRACT

A wavelength selective optical waveguide coupler (1) comprises a first undulatory optical D-fiber (2) and a second optical D-fiber (4) embedded in respective substrates (4,8). The fibers (2,6) are located adjacent one another, the undulations of the fiber (2) defining a set of regularly spaced optical coupling regions. This provides a readily formed coupler able to be accurately set to selectively couple a pre-selected wavelength by relatively coarse macroscopic adjustment.

22 Claims, 3 Drawing Sheets

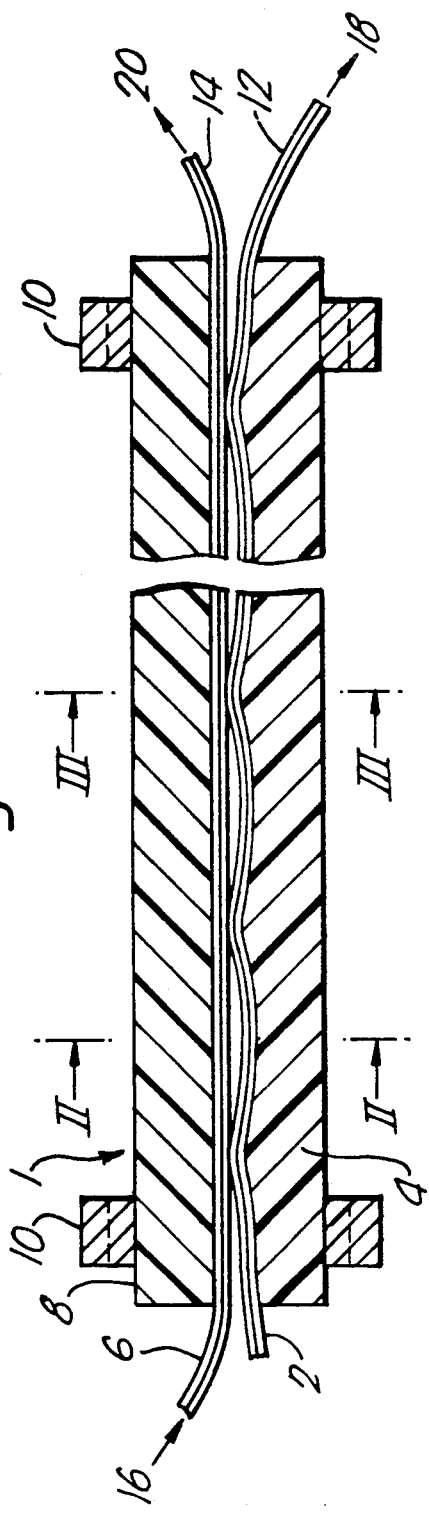
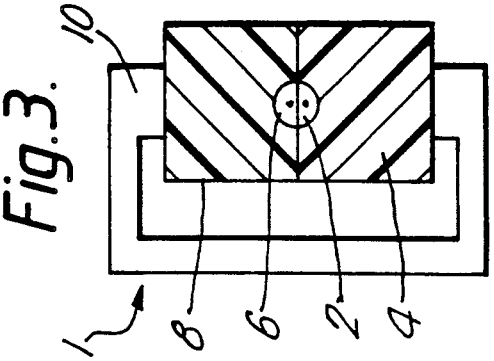
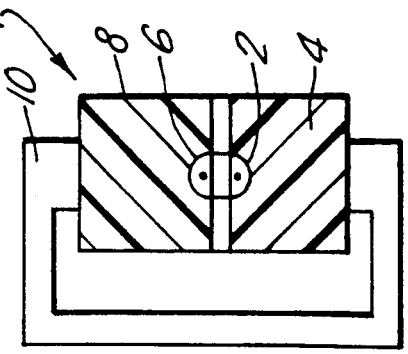

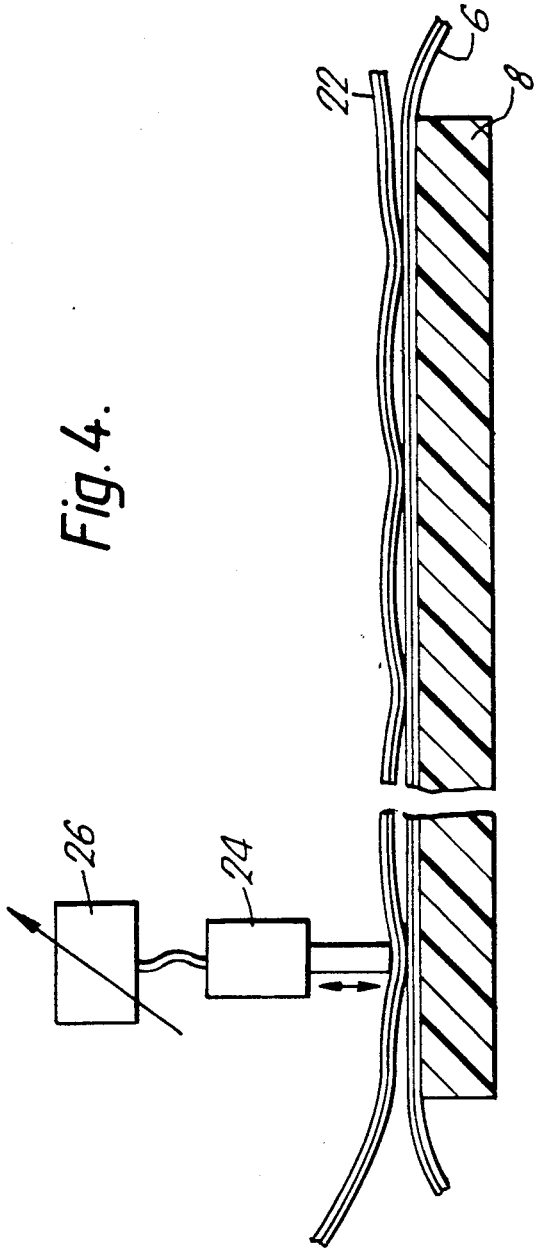
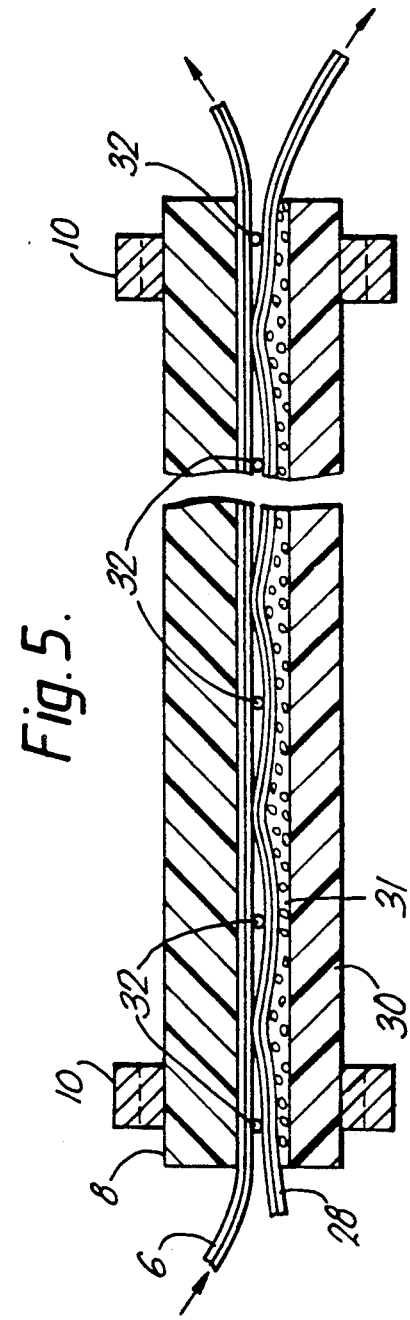

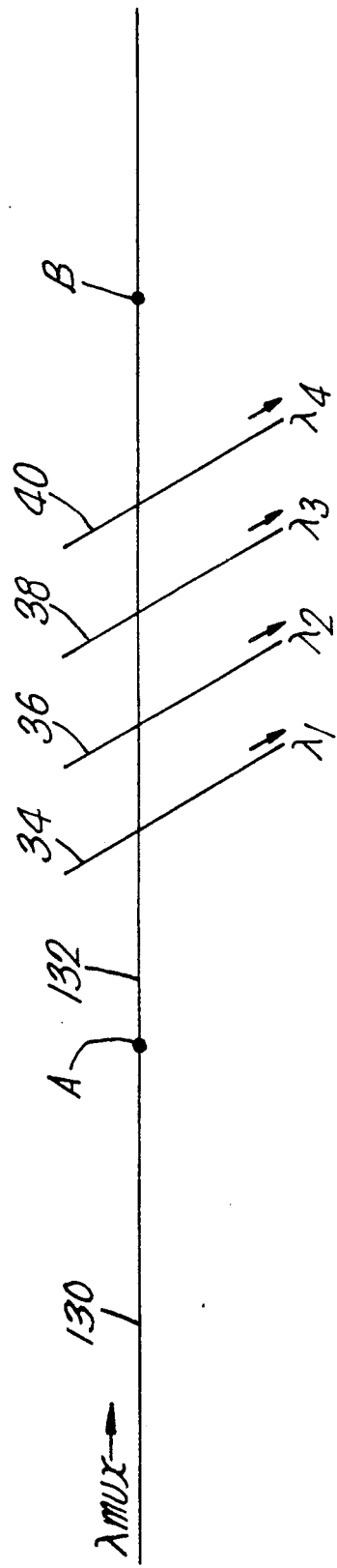
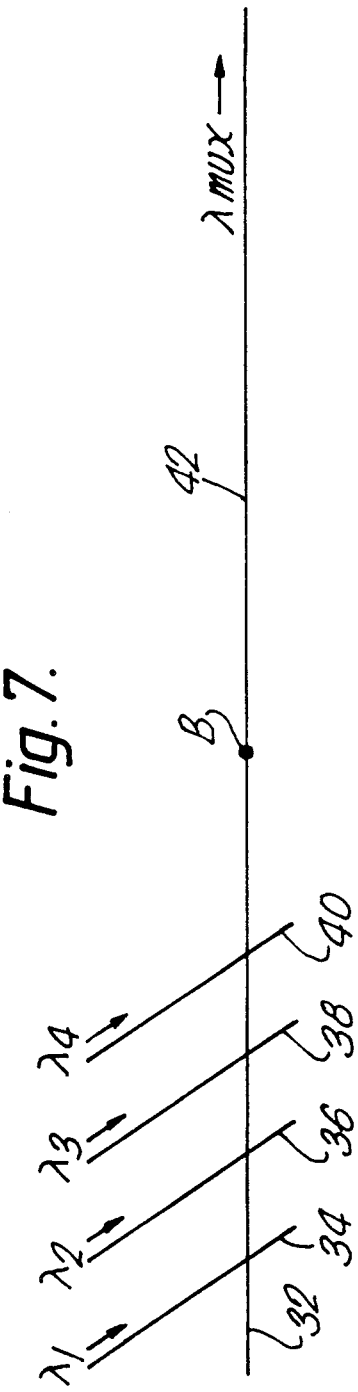

WAVELENGTH SELECTIVE OPTICAL WAVEGUIDE COUPLER

FIELD OF THE INVENTION

This invention relates to a wavelength selective optical waveguide coupler and particularly but not exclusively to a coupler formed from optical fibres having D-shaped cross-sections.

BACKGROUND OF THE INVENTION

It is known to form a wavelength selective optical waveguide coupler by locating a pair of optical waveguides adjacent each other so as to provide a set of regularly spaced apart optical coupling regions with the optical path length between the coupling regions being greater in one waveguide than the other, which optical path lengths are a function of wavelengths of the light propagating in the waveguide. Light propagating in one waveguide will couple varying amounts of light into or out of the other waveguide at each coupling region dependent on the relative phase relationship of the light in the two waveguides. The aggregate effect for light propagating through the coupling regions will be additive only for a wavelength in which the optical path difference between coupling regions is such as to cause a relative phase shift of an integral number of $2\pi$ radians along the length of the waveguide between the each coupling region. Such a coupler will couple substantially all light of a preselected wavelength from one waveguide into another whilst leaving the other wavelengths substantially unaffected. Examples of such couplers are disclosed in Patent Application No. GB2152694A.

One of the couplers there discussed comprises first and second slab waveguides constructed in a semiconductor substrate. The distance between the first and second waveguides is varied periodically so as to provide the set of regularly spaced optical coupling regions.

The waveguides are formed in a semiconductor substrate. The position of the first waveguide relative to the other cannot be altered so it not only involves relatively complex manufacturing techniques it is also not tunable.

Another of the couplers there disclosed comprises two optical fibre waveguides. The fibres are wound in opposite senses on respective mandrels of slightly different radii for several turns. The path length of a turn is therefore different for each fibre. Optical coupling regions are formed when the turns of each optical fibre are brought together (after reducing the cladding width if necessary). The turns of each of the fibres when brought together, meet at tangents. Coupling occurs at these tangents, and tuning may be achieved by stretching the fibres on one mandrel by increasing the radius of that mandrel.

A disadvantage of this second known type of coupler is that due to the long path length around the mandrels, accidental path differences due to temperature fluctuations for example are difficult to eliminate, and fractional control of the radius of each mandrel must be achieved to a high level of accuracy in order to accurately tune the coupler to selectively couple the desired wavelength.

SUMMARY OF THE INVENTION

According to the present invention there is provided a wavelength selective optical waveguide coupler comprising a first optical waveguide in the form of an undulatory optical fibre located adjacent to a second optical waveguide to define a set of regularly spaced optical coupling regions.

The undulatory nature of the first waveguide results in the distance between the first and second waveguides varying periodically along the length of the coupler. Thus the invention provides a simple means of obtaining a set of regularly and accurately spaced optical coupling regions that is relatively temperature insensitive.

The path difference between the coupling regions can be set accurately on the order of 1 $\mu$m by relatively coarse macroscopic adjustment of the fibres.

Preferably, each of the optical fibre and second optical waveguide comprises a single mode optical fibre having a cross-section which has a linear portion in each coupling region. Thus the respective linear portions of the first and second waveguides will form substantially planar surfaces lying in substantially parallel planes in the coupling region.

Conveniently, the optical fibres are D-fibres, that is optical fibres having a D-shaped cross-section with the core located nearer to the linear portion of the 'D' cross-section of the fibre, than to the curved portion. Such fibres are economical to make and easily manufacturable, and provide a convenient source of single optical fibres having the preferred linear portion in each coupling region. By placing the respective linear portions of the waveguides adjacent one another, the respective cores are close enough for coupling to occur across the coupling region.

The desired undulations in the optical fibre can be obtained in various ways.

The undulatory optical fibre may be an optical fibre mounted on an undulatory surface of a substrate. The substrate can be accurately machined to have the desired undulatory surface. When a fibre is mounted on the substrate it takes the form of the undulatory surface of the substrate. Conveniently, the surface of the substrate is made by forming V-grooves in the surface. This substrate may be made of silicon, and the V-grooves may then be formed by chemical etching processes.

Alternatively, the first waveguide may be mounted on an elastic support and the second waveguide may be mounted on or in a substrate having a substantially planar surface. Spacers can be placed at regular intervals along the length of the second waveguide the undulations of the first waveguide being formed by urging the deformable, elastic support towards the second optical waveguide, thus forcing the second waveguide against the spacers and second waveguide.

Preferably, the optical fibre is embedded in the substrate with the planar surfaces of the coupling regions flush with the surface of the substrate. This provides protection to the fibre, whilst allowing the fibre to come into and out of contact with the second optical waveguide. Conveniently, the substrate is a thermo-plastic material so the D-fibre may be embedded in the substrate by heating the substrate, and at the same time, applying a former to the fibre. The substrate will soften as a result of the heating. The former is chosen to have the desired undulatory shape the fibre will be moulded into the substrate, and will take the shape of the former.

This method of supporting the fibre is described in more detail in the applicant's GB application filed the same day as this application.

These methods of defining the undulations result in a fixed wavelength optical coupler. Where a tunable filter is required, a vibrating means is coupled to the first fibre to provide an acoustic transverse wave passing along the optical fibre. The acoustic wave causes the first fibre to vibrate and thus take up an undulatory form. By providing the vibrating means with a variable frequency of vibration the coupler may be tuned to operate at a described wavelength by varying the frequency of the vibration.

Means may be included for moving the optical waveguides into and out of optical coupling relationship. The coupler may thus be switched off by moving the waveguides out of optical coupling.

This can be achieved by using an optical fibre for the second optical waveguide supported so that it can be moved electrostatically into contact with the undulatory fibre when coupling is required. Other means of achieving switching can be readily devised.

Conveniently, there is included means for bending both the optical fibres in the plane containing both optical waveguides. By bending the fibres, the difference in optical path length between the coupling regions will alter, and the coupler will be tuned from one wavelength to another.

BRIEF DESCRIPTION OF THE DRAWINGS

Embodiment of the invention will now further be described by way of example only with reference to the following drawings in which:

FIG. 1 is a cross sectional view of a first embodiment an optical waveguide coupler made in accordance with the invention;

FIG. 2 is a cross section of the device showing FIG. 1 taken along line II—II of FIG. 1;

FIG. 3 is a cross sectional view of the device showed FIG. 1 taken along the line III—III of FIG. 1;

FIG. 4 is a cross sectional view of another embodiment of the invention;

FIG. 5 is a cross-sectional view of a yet further embodiment of the present invention; and FIGS. 6 and 7 are schematic diagrams of a first and second network architecture employing switchable couplers according to the present invention.

DETAILED DESCRIPTION OF THE DRAWINGS

Referring to FIG. 1, an optical waveguide coupler 1 comprises a first D-fibre 2 which is mounted in a first substrate 4 and a second D-fibre 6 mounted in a second substrate 8. The substrates 4 and 8 are held together by a pair of end-clamps 10. Fibre 2 is an undulatory fibre and is mounted in substrate 4. The surface 12 of D-fibre 2 is substantially flush with the surface of the substrate 4 at spaced locations such as shown in FIG. 3. The fibre 6 is also mounted in substrate 8 such that its surface 14 is substantially flush with the surface of the substrate 8. The surfaces of the fibres 2, 6 thus come into and out of contact with one another to form a coupling region. In the intervening regions, where the surface of fibre 2 is separated from the surface of the fibre 6, the distance between fibres 2 and 6 is too great to allow coupling to occur. Decoupled regions are therefore formed. Light of a pre-selected wavelength entering fibre 6 at port 16 will be substantially completely coupled into fibre 2 and will be output at port 18 of fibre 2. If an optical signal containing a plurality of wavelengths including the pre-selected wavelength is input at port 16 of fibre 6, light of the pre-selected wavelength will be filtered out of fibre 6 and will be output at port 18 of fibre 2. If the distance between coupling regions is P and the amplitude of the ripple or undulation is h, then the path difference between optical coupling regions, for small h, is approximately $d = h^2/8.P$. The longest wavelength passed by the filter is where the propagation constant $$\beta = \frac{2\pi}{d}.$$

Subsequent wavelengths are spaced such that $$\Delta \beta = \frac{2\pi}{d}$$

and the width of each pass band is of the order of $$\frac{2\pi}{dN}$$

where N is the total number of coupling points in the coupler. Light of all other wavelengths contained in the input signal will be output at port 20 of fibre 6. Bending the coupler 1 in the plane containing the fibres 2 and 6 causes the coupler to be tuned to a different wavelength because this varies p and h. In the embodiment of FIG. 1 a 3 mm ripple wavelength with an amplitude of 65 microns gives a path difference of 0.88 microns between coupling regions for a pass wavelength in the 0.6 to 1.6 micron window. A bend radius of 2 m would give about a 10% wavelength shift.

Referring to FIGS. 2 and 3, the relative positions of the fibres 2 and 6 are shown in the decoupling region and the coupling region respectively.

Referring to FIG. 4, a second embodiment of the present invention is shown. A D-fibre fibre 22, is located adjacent the fibre 6 mounted in a substrate 8 as in the FIG. 1 embodiment such that their flat surfaces are facing. Vibrating means 24, for example a piezo-electric transducer, is coupled to the fibre 2 such that an acoustic transverse wave may pass along the fibre 22. The acoustic wave passing along fibre 22 causes the fibre 22 to vibrate and thus take up an undulatory form. By varying the acoustic signal passing down the fibre 22 by means of a controller 26, the coupler 1 may be tuned to different wavelengths. For example, a one KHz signal will give a three centimetre wavelength ripple and 100 KHz wave will give a 3 millimeter ripple approximately.

Referring now to FIG. 5 there is shown an alternative method of providing the undulatory optical fibre. The optical D-fibre 28 is mounted on a support 30 having deformable portion support 31 which was then pressed by clamps 10 against the firmly supported D-fibre 6 between which spacers 32, for example silica cylinders, have previously been placed. The portion 31 deforms as the D-fibre 28 forms undulations of a period and height determined by the spacers.

A wavelength selective optical coupler according to the present invention arranged to be operated as a switch finds application in various network architectures as shown in FIGS. 6 and 7.

In FIG. 6 an optical fibre 30 carries a wavelength multiplex to a section of D-fibre 132 to which fibre 130 is spliced at splice A to form a common second optical waveguide on which undulating D-fibres 34, 36, 38 and 40 cross. Each cross-point forms a wavelength selective optical switch according to the present invention arranged to couple a pre-selected wavelength from the D-fibre 132 when the fibres are urged into coupling relationship, by mechanical or other means such as electrostatically. The arrangement of FIG. 6 can also be used to form a wavelength multiplex as shown in FIG. 7 for transmission down an optical fibre 42 to which the D-fibre is spliced at splice B. When any one of the undulating D-fibres 34 to 40 is urged into contact with the D-fibre 32, light of a preselected wavelength can be coupled into the fibre 132.

It will be appreciated other methods of forming the undulations may be devised in order to make a coupler according to the present invention.

The coupler of the present invention is not in any way restricted to those formed using D-fibres and other optical fibres able to form coupling regions with another optical waveguide may be used, for example a fibre having a rectangular cross-section and on offset core. The second waveguide is not restricted to those formed by an optical fibre. It may be a planar waveguide formed on a substrate, for example.

We claim:

1. An optical waveguide coupler comprising a first single mode optical waveguide and a second single mode optical waveguide, the coupler being constructed to pass selectively a signal of a desired wavelength from one of the optical waveguides to the other optical waveguide, in which the first optical waveguide is in the form of a non-coiled undulatory optical fibre extending alongside the second optical waveguide to define a set of optical coupling regions spaced apart by a predetermined distance (P).

2. A coupler as claimed in claim 1 in which the undulatory optical fibre and said second optical waveguide each comprise a single mode optical fibre having a cross section which includes a linear portion in each coupling region.

3. An optical coupler as claimed in claim 1 including means for substantially simultaneously moving the set of regularly spaced optical coupling regions of said optical waveguides into and out of optical coupling relationship.

4. An optical waveguide coupler as claimed in claim 1 in which the amplitude (H) of each undulation between each pair of optical coupling regions is the same, and said desired wavelength is a function of said amplitude (H).

5. An optical waveguide coupler as claimed in claim 4 in which said desired wavelength is a function of both said predetermined distance (P) and said amplitude (H).

6. A wavelength selective optical waveguide coupler comprising:
a first optical waveguide in the form of an undulatory optical fibre located adjacent to a second optical waveguide to define a set of regularly spaced coupling regions,
said first and second waveguides each comprising a single mode optical D-fibre having a D-shaped cross section with their linear portions juxtaposed in each coupling region.

7. A wavelength selective optical waveguide coupler comprising:
a first optical waveguide in the form of an undulatory optical fibre located adjacent to a second optical waveguide to define a set of regularly spaced optical coupling regions,
the undulatory optical fibre being an optical fibre mounted on an undulatory surface of a substrate.

8. A wavelength selective optical waveguide coupler, comprising:
a first optical waveguide in the form of an undulatory optical fibre located adjacent to a second optical waveguide to define a set of regularly spaced optical coupling regions,
each waveguide comprising a single mode optical fibre having a cross section which includes a linear portion in each coupling region;
the undulatory optical fibre being embedded in a substrate with the coupling regions flush with the surface of the substrate.

9. An optical coupler as claimed in claim 8 in which the substrate is a thermo-plastic material.

10. A wavelength selective optical waveguide coupler comprising:
a first optical waveguide in the form of an undulatory optical fibre located adjacent to a second optical waveguide to define a set of regularly spaced optical coupling regions,
the undulatory waveguide being mounted on an elastic support and there are spacers between the first and second waveguides.

11. A wavelength selective optical waveguide coupler comprising:
a first optical waveguide in the form of an undulatory optical fibre located adjacent to a second optical waveguide to define a set of regularly spaced optical coupling regions; and
vibrating means coupled to the first optical waveguide to provide an acoustic transverse wave passing along the optical fibre.

12. An optical coupler as claimed in claim 11 in which the vibrating means has a variable frequency of vibration.

13. A wavelength selective optical waveguide coupler comprising:
a first optical waveguide in the form of an undulatory optical fibre located adjacent to a second optical waveguide to define a set of regularly spaced optical coupling regions; and
means for bending the optical waveguides in a plane containing the optical waveguides.

14. A wavelength selective optical signal coupler comprising:
a pair of single mode optical waveguides passing in coupling proximity to one another at a set of optical coupling regions, which are uniformly spaced apart by a distance related to the desired wavelength selectively coupled by said waveguides,
said optical waveguides being co-located at a common geometrical surface, and
at least one of said optical waveguides being an optical fibre waveguide with its axis displaced in ripple-like undulations along said set of optical coupling regions.

15. A wavelength selective optical signal coupler as in claim 14 wherein a first of said waveguides has a substantially linear axis and the other of said waveguides has ripple-like undulations along said set of optical coupling regions.

16. A wavelength selective optical signal coupler as in claim 15 wherein both said waveguides are optical fibres having a D-shaped cross section.

17. A wavelength selective optical signal coupler as in claim 15 wherein said at least one optical fibre waveguide has a D-shaped cross section with its flat side disposed toward the other waveguide and further comprising:

means for establishing a mechanical standing wave in said at least one optical fibre to define the spacing between said coupling regions by the wavelength of said standing wave.

18. A wavelength selective optical signal coupler as in claim 14 including:

means for controllably changing the spacing between said optical coupling regions to controllably change the wavelength of optical signals selectively coupled from one of said waveguides to the other.

19. A wavelength selective optical signal coupler as claimed in claim 18 in which said means for controllably changing the spacing between said optical coupling regions comprises vibrating means coupled to said at least one of said optical waveguides such that an acoustic transverse wave is formed along the said at least one of said optical waveguides.

20. A wavelength selective optical signal coupler as in claim 14 wherein said common geometrical surface is a plane.

21. A waveguide selective optical signal coupler as in claim 20 wherein said waveguides are mounted to permit simultaneous bending of them within said plane to change the wavelength of optical signals selectively coupled from one of the waveguides to the other.

22. A waveguide selective optical signal coupler as in claim 14 wherein each of said waveguides is an optical fibre mounted within a groove of a substrate block that defines the location of the fibre axis and further comprising means for positioning the substrate blocks with respect to one another.

* * * * *